United States Patent [19]

Reuter

[11] Patent Number: 5,407,701
[45] Date of Patent: Apr. 18, 1995

[54] CORDS FOR PNEUMATIC TIRES AND PROCESS FOR MAKING THEM

[75] Inventor: René F. Reuter, Burden, Luxembourg

[73] Assignee: The Goodyear Tire & Rubber Company, Akron, Ohio

[21] Appl. No.: 61,094

[22] Filed: May 14, 1993

[51] Int. Cl.⁶ .............................................. B05D 3/12
[52] U.S. Cl. .................................. 427/177; 152/527; 427/207.1; 427/381; 427/389.9; 428/261; 428/395
[58] Field of Search ............ 152/527; 427/177, 207.1, 427/381, 389.9; 428/261, 395

[56] References Cited

U.S. PATENT DOCUMENTS

| | | | |
|---|---|---|---|
| 3,307,962 | 3/1967 | Hardy | 427/177 |
| 4,155,394 | 5/1979 | Shepard et al. | 152/527 |
| 4,389,839 | 6/1983 | van der Werff | 152/556 X |
| 4,416,935 | 11/1983 | Bascom et al. | 152/563 X |
| 4,850,412 | 7/1989 | Gupta | 152/556 |
| 5,036,896 | 8/1991 | Welter et al. | 152/527 X |

Primary Examiner—Michael Lusignan
Attorney, Agent, or Firm—David E. Wheeler

[57] ABSTRACT

A method of preparing a ply of composite material by applying an adhesive to a textile material comprising greige cords, so as to achieve an acceptable bond between the cords an elastomeric matrix, while not significantly altering the properties of the cords, is provided. The textile material comprises warp cords and weft cords; the weft cords are used to convey the warp cords through a heat setting oven without applying substantial tension to the warp cords, so as to not change their stress-strain properties. In the illustrated embodiment, the warp cords comprise aramid having a linear density of 500 to 3600 Denier and a twist multiplier of 5 to 8. The cords can be used in a crown reinforcing spirally wound overlay structure of a tire.

2 Claims, 3 Drawing Sheets

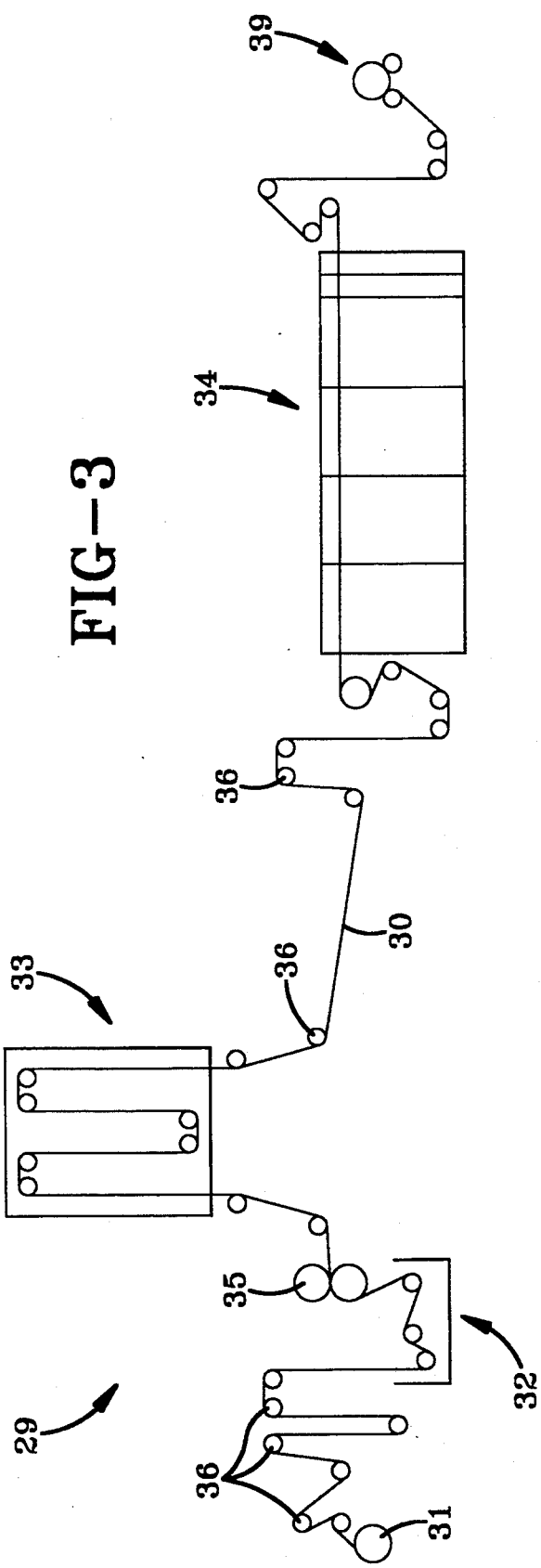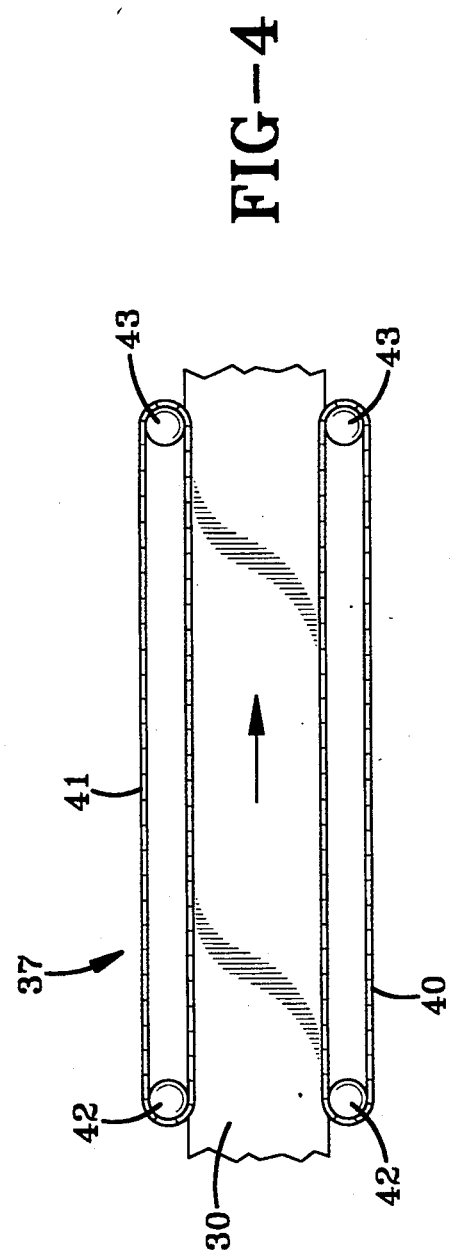

CORDS FOR PNEUMATIC TIRES AND PROCESS FOR MAKING THEM

BACKGROUND

The present invention relates to a process for dipping a ply of greige cords, used for reinforcing pneumatic tires, and pneumatic tires comprising radial carcass plies made with such cords.

Radial carcass tires, having a reinforcing member disposed radially outwardly of the belt assembly and comprising textile cords oriented at small angles with respect to the mid-circumferential plane of the tire, have been found to be particularly durable when subjected to high revolution speeds.

Such a reinforcing member, referred to as an overlay ply, may comprise a spirally wound strip, made from cord reinforced elastomeric material, located radially outward of the belt plies. Generally, the material of the reinforcing cords have a low modulus, for instance nylon, in order to accommodate the expansion of the belt during the shaping and vulcanizing steps in the manufacture of a tire. The modulus of a cord is, inter alia, a function of the twist of the different yarns used in the cord, the cord twist, and the manner that the cord is subjected to the dipping operation.

High modulus materials, e.g. aramid, have potential advantages in high speed tires in view of their dimensional stability, but because of their dimensional stability, such cords must be twisted, so that the finished cord has the expansion potential required to match the expansion that a tire goes through during shaping and vulcanizing.

EP-A-412 928 discloses a textile overlay structure which is reinforced with cords made of aramid; the cords have a twist multiplier (as defined herebelow) between 6 and 14 and at least one of the yarns included in the cords has a twist of at least 14 turns per inch (TPI) (540 turns per meter (TPM)). Tires comprising such an overlay structure, however, have an increased noise emission, because the high modulus aramid cords vibrate like violin strings in the tire.

It is an object of the present invention to provide a process for coating a ply of greige cords, used for reinforcing pneumatic tires, with an adhesive, without substantially changing the physical properties of the cords.

It is a further object of the present invention to provide a pneumatic tire with an overlay structure reinforced with aramid cords, which has a low gauge, low noise emission, and maintains good high speed properties.

Other objects of the invention will be apparent from the following description and claims.

SUMMARY OF THE INVENTION

A method of preparing a composite ply by applying an adhesive to a textile material comprising greige cords, in which the textile comprises warp cords and weft cords, is provided. The adhesive is adapted to achieve an acceptable bond between the cords and all elastomeric matrix. The process comprises the steps of, (a) preparing the warp cords in the textile material to have a tensile strength per denier at least 3 times greater than the weft cords, and a twist multiplier of 5 to 9, (b) unwinding a roll of greige textile material from a payoff, (c) impregnating the textile material with an adhesive material to form a ply, (d) pre-drying the ply, to obtain a dry, coated textile material, (e) displacing the ply through a heat setting oven, using means which do not apply a substantial tension to the warp cords of the ply, and (f) winding the ply of treated textile material on a roll.

In an illustrated embodiment, the means which do not apply a substantial tension to the warp cords of the textile material is a tenter frame. Also, the weft cords are a filling material and the warp cords comprise aramid.

Also provided is a cord made of a single yarn of aramid, coated with an adhesive which provides an acceptable bond between the cord and an elastomeric matrix. In a preferred embodiment, the cord has a linear density between 1200 and 1800 Denier and a twist multiplier in the range of 5 to 9, and a stress below 10N at an elongation of 1%.

Also provided is a ply comprising warp and weft cords coated with an adhesive which achieves an acceptable bond between the cords of the ply and an elastomeric matrix.

Also provided is a cured pneumatic tire comprising a radial ply carcass, a tread disposed radially outward of the crown region of the carcass, and a crown reinforcing structure interposed between the tread portion and the crown region of the carcass in circumferential surrounding relation to the carcass. The crown reinforcing structure includes a belt assembly having at least a first radially innermost, and a second radially outermost belt ply, each of the belt plies comprising reinforcement cords of high modulus material which extend parallel to one another in each belt ply. The cords in the first belt ply make opposed angles with the cords in the second belt ply with respect to the equatorial plane of the tire. The reinforcing structure also includes a textile overlay structure, which comprises cord reinforced elastomeric material, which is superimposed radially outwardly of the belt assembly. The overlay comprises a spirally wound strip which makes an angle of between 0° and 5° with the equatorial plane of the tire, extending transversely over the belt assembly.

BRIEF DESCRIPTION OF THE DRAWINGS

FIG. 3 is a schematic plan view of an apparatus which can be used in the process according to the invention;

FIG. 4 is a schematic view from above on a tenter frame; and

DETAILED DESCRIPTION OF THE INVENTION

Figure 1:
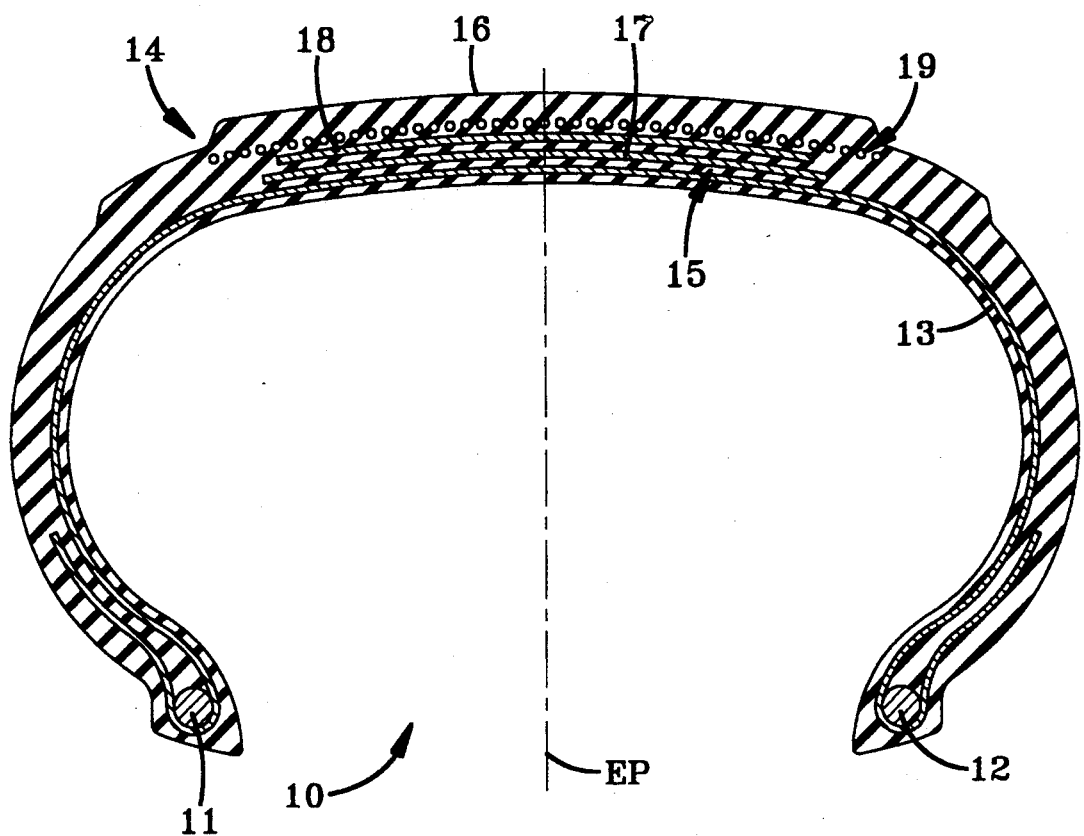
FIG. 1 is a cross-sectional view of a pneumatic tire made in accordance with the present invention.

With reference to FIG. 1, there is represented a radial carcass pneumatic tire 10 having a pair of substantially inextensible bead cores 11, 12 which are axially spaced apart with a radial carcass ply 13 extending between the bead cores. The carcass ply is folded axially and radially outwardly about each of the bead cores and is reinforced by cords which are substantially parallel to each other and make an angle with the equatorial plane (EP) of the tire. As used herein and in the claims, the "equatorial plane" of the tire is a plane that is perpendicular to the axis of rotation of the tire and passes through the center of the tire tread, and the terms "radial" and "radially" refer to directions that are radially toward or away from the axis of rotation of the tire. The cords of the carcass ply 13 can be made of any suitable textile material, such as rayon, polyester, polyamide and aromatic polyamide. The crown area 14 of the tire 10 is reinforced by a belt assembly 15 located radially inward of the tire tread 16. The belt assembly is essentially rigid and comprises two concentric belt plies 17 and 18, each of which consists of an elastomeric layer reinforced by steel cords or cords of other suitable materials, as for example aromatic polyamide, glass-fiber, carbon-fiber and rayon. Within each ply, the cords are substantially parallel to each other. The cords of the radially innermost belt ply 17 usually make an angle of 12° to 30° with the equatorial plane (EP) of the (cured) tire, whereas the cords of the radially outermost belt ply 18 extend in the diagonally opposite direction to the cords of the radially innermost belt ply, i.e. they make an angle of between −12° to −30° with the equatorial plane (EP) of the tire; preferred angles are respectively 21° to 25° and −21° to −25°.

A spirally wound strip 19 is superimposed radially outward of the outermost belt ply 18 and extends transversely over the widest of the belt plies. In the illustrated embodiment, the spirally wound strip is made from elastomeric material reinforced by aramid cords. As used herein, "aramid" and "aromatic polyamide" are both understood to mean a manufactured fiber in which the fiber-forming substance is generally recognized as a long chain synthetic aromatic polyamide in which at least 85% of the amide linkages are attached directly to the two aromatic rings. Representative of an aramid or aromatic polyamide is a poly (p-phenyleneterephthalamide).

The spiral convolutions of the strip make an angle of between 0 and 5° with the equatorial plane (EP) and are in abutment with any axially adjacent convolution. The strip has preferably a thickness of 0.4 to 1.2 mm and a width of 8 to 25 mm and a cord distribution density of at least 15 ends per inch (EPI) (600 ends per meter (EPM)) and preferably 20 to 50 EPI (800 to 2,000 EPM).

The spirally wound overlay structure overlaps the lateral ends of the radially outermost belt ply by a few mm and provides excellent rigidity in the circumferential direction and helps provide a uniform pressure distribution on the tread surface.

Although the overlay structure shown in FIG. 1 has only one layer, those skilled in the art will recognize that more than one layer can be used. For example the overlay structure could also comprise a second layer located adjacent to and radially outside of the first layer. Preferably, a second layer will have its spiral convolutions wound with the opposite hand to the first layer so that the cords of each layer cross at a very small angle. With such a construction, the two layers can be wound continuously in succession without a break in the strip. It is to be understood that each spiral convolution of the spirally wound strip may be in abutment with any adjacent convolution, or can have an overlapping relationship with axially adjacent convolutions. Such an overlap can be constant or variable across the width of the belt reinforcing structure. Other variations in the winding of a spiral strip will be apparent to those skilled in the art.

It is well known in the tire art that individual spiral convolutions in a tire built on a flat cylindrical drum are subjected to different elongations during the shaping and vulcanizing step of the tire manufacturing process, because expansion of the tire is greater in the center portion than the shoulder portions of the belt reinforcing structure. In order to minimize the resulting differences in the stresses on the strip, it is preferable to wind the strip in the belt center with a very small winding tension as compared to the winding tension used when making the tire shoulder portion. Alternatively, the surface of the cylindrical drum upon which the strip is spirally wound can be given a slightly convex shape. This convex shape should conform as closely as possible to the sectional radial shape the overlay ply takes in the finished tire, so as to obtain a minimal stretch difference between the center and shoulder portions of the overlay strip during shaping and curing.

Figure 2:
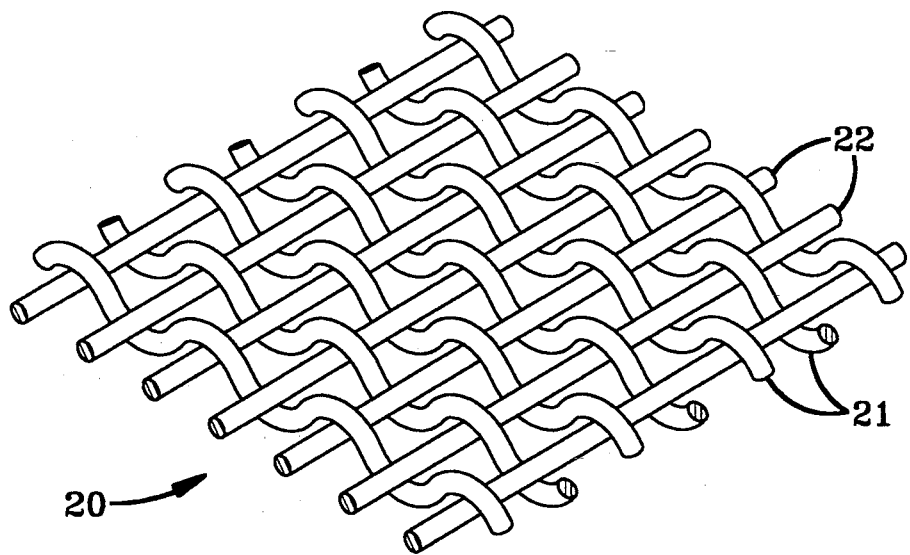
FIG. 2 is a side view of a ply of cords.

Referring now to FIG. 2, there is shown a portion of a textile fabric 20, comprising warp cords 21 of aramid, and weft cords 22 of a filling material such as cotton. In the illustrated embodiment, the warp cords 21 are single yarns of aramid having their component filaments twisted together a given number of turns per unit of length of the yarn (usually expressed in turns per inch, TPI). The weft cords have a cord distribution density of at most 10 EPI, preferably of about 5 EPI, and a linear density below 500 Denier, and preferably of about 200 Denier. The weft cords have no reinforcing function in the tire, and they assure mainly a correct positioning and spacing of the warp cords during the processing of the ply, and during the different tire building operations, up to the shaping and vulcanizing step. In its processing, such a textile fabric has a length of several hundred meters and a width of about 1.5 m. After dipping and calendering, the ply 20 is cut lengthwise into strips, having a width of 8 to 25 mm, which are superimposed radially outward of the outermost belt ply 18 of the tire.

As used herein, the textile fabric becomes a ply (composite) after it is coated with adhesive and/or rubber.

The warp cords according to the present invention have a twist of at least 6 TPI and more preferably of at least 10 TPI. Cords having such twists, have shown the required expansion characteristics which permits green tire expansion in the curing mold. The direction of twist, i.e. the direction of slope of the spirals of a yarn when it is held vertically, has no measurable influence on the properties of the yarn.

A cord according to the present invention has a twist multiplier between 4 and 10 and preferably between 6 and 8. "Twist multiplier" refers to a number that is an indicator of the helix angle that the yarns in a cord make with respect to a longitudinal axis of a cord. As used herein and in the claims, the twist multiplier of a cord is determined according to the following equation which is well known in the textile art:

$$TM = 0.0137 \, CT \times (CD)^{\frac{1}{2}}$$

wherein TM is the twist multiplier;
CT is the number of turns per inch (2.54 cm) of cord length; and
CD is the sum of the deniers of the yarns, and/or subgroups of the yarns of the cord before any twist is imparted to the yarns or subgroups. The twist multiplier is an important feature of a cord, because it characterizes its physical properties, like tensile strength, modulus, elongation and fatigue. Twist multipliers above 5 characterize cords showing fair elongation properties and excellent tensile strength.

Examples of single yarns of aramid which can be used for reinforcing spirally wound overlays are:

|  | Twist multiplier | Twist (TPI) |
| --- | --- | --- |
| 500 Denier | 5–9 | 16–29 |
| 1 000 Denier | 5–9 | 11–21 |
| 1 500 Denier | 5–9 | 10–17 |
| 3 000 Denier | 5–9 | 7–12 |

Applying an adhesive to the greige cords of textile material is necessary to achieve an acceptable bond between the cords to the elastomeric matrix, as described by DuPont in product bulletins relating to Kevlar®, e.g. "KEVLAR® SUBCOAT AND TOPCOAT PREPARATION FOR TYPE 950 (TIRES) AND TYPE 956 (MECHANICAL RUBBER GOODS)", Geneva, January 1983. Following the teachings of DuPont, for use in the present invention, the aramid yarn, when used without an epoxy pretreatment, can be prepared using two dips; a first dip using IPD 31, IPD 34 or IPD 38 (the IPD numbers are DuPont product identification numbers), and a second dip using IPD 39. If an aramid yarn having an epoxy pretreatment is used, a dip comprising IPD 31 can be used.

Such dipping formulations are well known in the art as illustrated by French patent application 2,671,113-A1.

Of course, if two dips are used, the equipment may comprise two saturators, two sets of squeeze rolls and two predryers.

FIG. 3 shows a schematic plan view of equipment 30 which can be used to apply an adhesive to cord or yarn. The equipment 29 includes a pay-off 31 for unwinding a roll of greige textile material, a number of guiding rolls 36, a saturator 32 for impregnating the textile with adhesive, squeeze rolls 35 to pinch excess dip out of the textile, and a pre-dryer 33 used to dry the coated ply of textile material. Finally the ply of textile material crosses a heat setting oven 34. This oven operates at a temperature which causes the adhesive to react with the textile material, preferably between 180° C. and 250° C. The oven 34 is followed by a wind-up unit 39. The squeeze rolls 35 and the wind-up unit 39 are driven by electric motors.

According to the invention, the oven 34 is provided with a tenter frame 37 (see also FIG. 4). Such a tenter frame comprises essentially two parallel chains 40 and 41, about 1.5 m apart. Each chain moves along rails, from a chain turnaround entrance 42 located at one end of the oven, and around a turnaround exit 43 located at the other end of the oven, and back to the entrance. The chain links have a length of about 10 cm and are equipped with pin plates, clips and anti-depinning devices. At the turnaround entrances 42, the textile ply 30, and more specifically the weft cords of cotton 22 and some of the warp cords of aramid 21 (see FIG. 2) located near the two outer borders of the ply, are gripped by the pin plates and secured thereon by the clips. With the help of the weft cords, the pin plates convey the aramid warp cord through the oven 34 without applying a substantial tension on the warp cord. Before reaching the turnaround exits 43, the anti-depinning devices liberate the dipped fabric from the pin plates. Both the turnaround entrances and exits are provided with electric motors. Such tenter frames are, for example, commercialized by H. Krantz GmbH & Co., Maschinenbau, 5100 Aachen, Germany.

In the prior art, the ply is pulled lengthwise from the pay-off 31, through the saturator 32, the pre-dryer 33 and the oven 34, applying thereby a substantial tension force on the warp cords 21 during all the process steps. This tension force stretches the cords, thereby modifying the modulus of the cords. According to the present invention, the ply is only pulled through the saturator and the pre-dryer, where the cords still possess sufficient elasticity to recover substantially the modulus the cords obtained through the twisting operation, once the stretching force stopped. However in the oven 34, the combined action of the heat and the chemical reaction of the adhesive with the aramid cords leads to an irreversible change of the modulus; put in other words, the cords retain (apart from the usual variations due to the temperature change) substantially the modulus they acquire during their stay in the oven. By applying only a minimum tension force to the warp cords in the oven, the modulus of the aramid cords treated as taught by the invention is consequently much lower than the modulus of cords treated according to the prior art.

Figure 5:
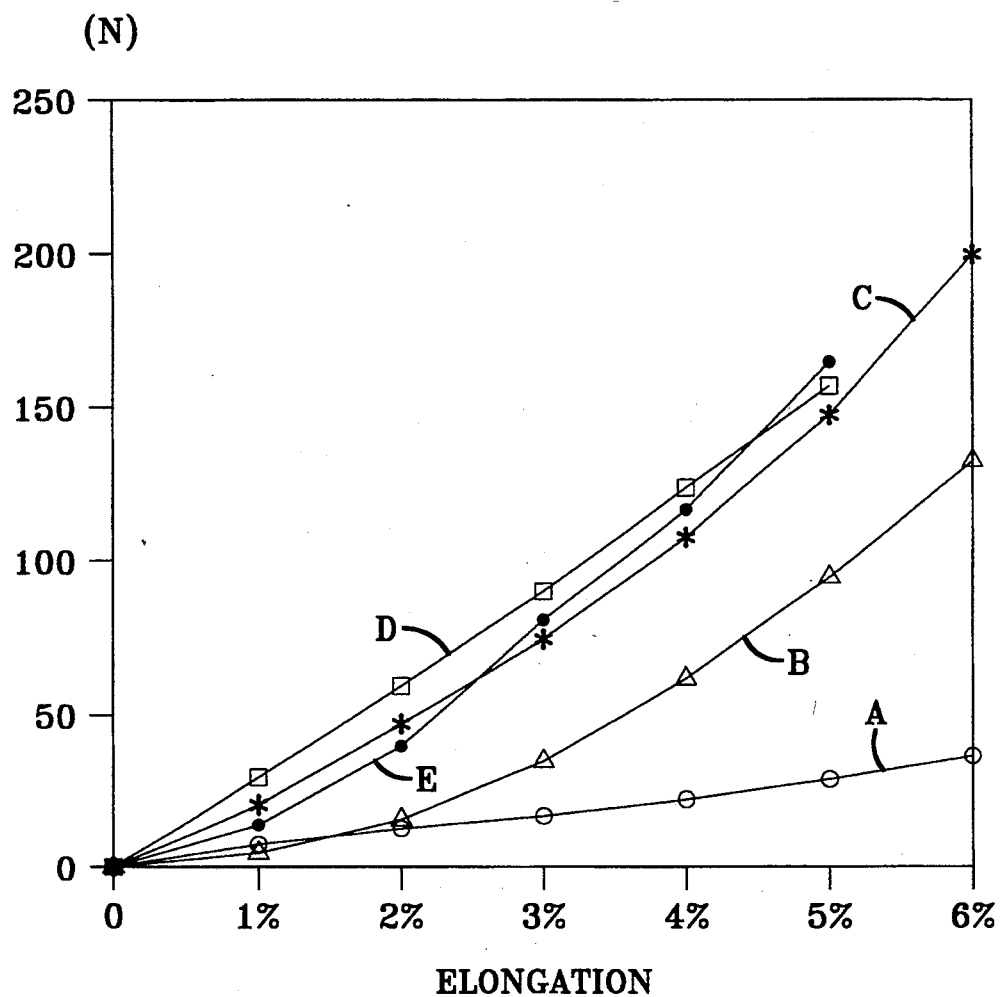
FIG. 5 is a stress strain graph comparing prior art cords and cords of the invention.

FIG. 5 shows a stress-strain graph of different textile cords after being treated with an adhesive. The abscissa displays the percentage elongation, and the ordinate displays the applied force in Newtons, for a nylon cord 840/2, 12/12 TPI (graph A); for an aramid cord 1500/1, 13 TPI (graph B); for an aramid cord 1000/2, 16/16 TPI (graph C); and for an aramid cord 1500/1, 13 TPI (graph D). The nylon cord 840/2;12/12 TPI (graph A), the aramid cord 1000/2;16/16 TPI (graph C) and the aramid cord 1500/1;13 TPI (graph D) have been treated according to conventional technology whereas the aramid cord 1500/1;13 TPI (graph B) has been heat treated using a tenter frame.

The single yarn aramid cord 1500/1 (graph B) shows, an elongation up to 2%, and stress-strain properties similar to those of a conventionally treated nylon cord 840/2. Such a nylon cord is commonly used to reinforce spirally wound overlays. This confirms that aramid cords treated according to the invention have a high expansion potential permitting easy shaping of a tire. At higher elongations (beyond 2%) graph B, as compared to graph A, the aramid cord has greater restrictive properties than the nylon cord, leading to better high speed performance of the tire.

The aramid cord 1000/2 (graph C) has an acceptable expansion potential and even better restrictive properties than the aramid cord 1500/1 (graph B). But tests have shown that tires comprising a spirally wound overlay reinforced with such cords may be subject to an increased noise emission.

Graph E shows the stress-strain response of an aramid cord 1500/1;13 TPI, in an uninflated, cured tire. The graph was measured on a cord, treated using the process according to the invention, which has been retrieved from a tire and carefully freed of elastomeric material. It appears that graph E corresponds roughly to graph B shifted along the x-axis by about 1,5%. This shift is mainly ascribed to the elongation the cord is submitted to during the shaping and vulcanizing step of the tire; this elongation is irreversible due to the tire cure. The data was obtained using ASTMD-885M-85.

Based on noise considerations, the expansion potential and the shift in the stress-strain curve of the cords during the curing step, as well as the reinforcement properties of the aramid cords, the following stress-strain values of 1500/1 aramid cords and aramid fabrics are determined (the values for aramid fabrics are indicated between brackets; those values are representative of the required reinforcement characteristics per unit of fabric width, regardless of the linear density of the cords or the number of yarns in the cords):

DIPPED PROPERTIES BEFORE TIRE CURE

Elongation at 1%.

The stress of the aramid cord should be below 10N (300N per inch), a value of about 5N (150N per inch) being preferred.

Elongation at 2%.

The stress of the aramid cord should be below 20N (600N per inch), a value of about 15N (450N per inch) being preferred.

Elongation at 3%.

The stress of the aramid cord should be above 50N (1500N per inch), a value of about 60N (1800N per inch) being preferred.

IN TIRE PROPERTIES

Elongation at 1%.

The stress of the aramid cord should be below 25N (750N per inch), a value of about 15N (450N per inch) being preferred.

Elongation at 2%.

The stress of the aramid cord should be above 30N (900N per inch), a value of about 40N (1200N per inch) being preferred.

Elongation at 3%

The stress of the aramid cord should be above 60N (1800N per inch), a value of about 75N (2250N per inch) being preferred.

It is understood that although the greatest weight and cost benefits can be derived from the invention by using cords made of mono-yarns, cords including more than one yarn can also be treated in a tenter frame and built into tires. In this case the lateral density of the cords in the ply is modified (usually reduced) so as to take into account the modified (usually higher) linear cord density.

The ply is preferably adapted for use as a reinforcing ply in some portion of a pneumatic tire. The ply preferably has warp cords comprising aramid having a stress below 300N per inch at 1% elongation, a stress below 600N per inch at 2% elongation, and a stress above 1500N per inch at 3% elongation.

In an illustrated embodiment, the aramid cords have a stress of 75 to 300, preferably 100 to 200N per inch at 1% elongation, a stress of 300 to 600, preferably 400 to 500N per inch at 2% elongation, a stress of 1400 to 2500, preferably 1600 to 2000N per inch at 3% elongation.

In the illustrated embodiment, when used as an overlay in a tire, the textile overlay structure is reinforced with cords of aramid having a stress below 750N per inch at 1% elongation, a stress above 900N per inch at 2% elongation, and a stress above 1800N per inch at 3% elongation.

In a preferred embodiment, the cords of the overlay are aramid which have a stress of 225 to 750, preferably 350 to 550N per inch at 1% elongation, a stress of 900 to 1500, preferably 1000 to 1400N per inch at 2% elongation, and a stress of 1800 to 2700, preferably 2000 to 2500N per inch at 3% elongation. Also, each cord comprises a single yarn having a linear density ranging between 1200 and 1800 Denier.

In an alternative embodiment of the pneumatic tire, the cord comprises two yarns each having a linear density ranging between 800 and 1200 Denier.

The single yarns have a smaller section width than the cords. A ply including such calendared cords (comprising single yarns) consequently has a lower gauge. This results in lighter tires, using less material while maintaining reinforcing strength.

While certain representative embodiments and details have been set forth for the purpose of illustrating the invention, it will be apparent to those skilled in the art that various changes and modifications may be made therein without departing from the spirit or scope of the invention as defined in the appended claims.

What is claimed is:

1. A method of preparing a composite material ply, comprising the steps of:
   (a) preparing a greige textile fabric material to have warp cords having a tensile strength per denier at least 3 times higher than weft cords, said warp cords having a twist multiplier of 5 to 9,
   (b) unwinding a roll of greige textile material from a pay-off,
   (c) impregnating the textile material with at least one adhesive material,
   (d) pre-drying the textile material, to obtain a dry, coated ply of textile material,
   (e) displacing the ply through a heat setting oven, using a tenter frame which applies negligible tension to the warp cords of the ply whereby a modulus of the cords attained in a twisting operation is maintained, and
   (f) winding the ply of treated textile material on a roll.

2. The method of preparing a composite material according to claim 1, which comprises the further steps of selecting the weft cords to be a filling material and the warp cords to be aramid.

* * * * *